July 16, 1963    K. R. JACKSON ETAL    3,097,529
FLOWMETER

Filed Feb. 24, 1960    2 Sheets-Sheet 1

INVENTORS.
KENNETH R. JACKSON
WILLIAM SEIDEN
BY
R. E. Geauque
ATTORNEY

July 16, 1963 K. R. JACKSON ETAL 3,097,529
FLOWMETER
Filed Feb. 24, 1960 2 Sheets-Sheet 2

INVENTORS.
KENNETH R. JACKSON
WILLIAM SEIDEN
BY
R. E. Deangue
ATTORNEY

United States Patent Office 3,097,529
Patented July 16, 1963

3,097,529
FLOWMETER
Kenneth R. Jackson, Los Angeles, and William Seiden, Encino, Calif., assignors, by mesne assignments, to The Foxboro Company, a corporation of Massachusetts
Filed Feb. 24, 1960, Ser. No. 10,626
10 Claims. (Cl. 73—231)

This invention relates to a turbine type of flowmeter and more particularly to a flowmeter in which the rotor is supported by bearing surfaces created by the fluid being metered and in which the axial thrust on the rotor shifts from the downstream direction to the upstream direction as the flow velocity exceeds a predetermined value.

Some present types of turbine flowmeters utilize the fluid being metered to produce a fluid force in opposition to the axial force on the rotor which is continually in the downstream direction. However, such flowmeters do not support the rotor in the radial direction on a fluid bearing created by fluid flowing in the meter and do not utilize a surface within the flowmeter to produce upstream thrust on the rotor at all velocities so that net thrust on the rotor is reduced at low velocities and the net resulting thrust is in an upstream direction at intermediate and high velocities.

Basically, the invention utilizes a passage open to the fluid upstream of the rotor and this passage introduces the fluid to the interior surface of a bearing sleeve. The bearing sleeve which carries the turbine rotor, surrounds a shaft and is confined at both the upstream and downstream sides. The clearance around the bearing sleeve permits a small amount of fluid to flow around the bearing sleeve in both the upstream and downstream directions and then into the fluid stream. Thus, the fluid provides a fluid bearing surface at the interior surface of the bearing sleeve and provides fluid thrust bearing surfaces at opposite ends of the bearing sleeve. The creation of the fluid bearing surface eliminates the necessity for mechanical bearings and supporting structure therefor.

A filter is located in the fluid supply passage for the bearing sleeve in order to remove all contamination from the fluid which reaches the bearing sleeve and forms the bearing surface. Thus, the metered fluid provides the bearing surface and a separate lubricant for the bearing sleeve is not necessary. In most all prior fluid flowmeters, the flowing fluid serves as the lubricant for mechanical bearings since it is not practical to seal the mechanical bearings against the flowing fluid. Because many fluids, such as gasoline, are not good lubricants for mechanical bearings, these fluids cannot be metered satisfactorily even though prelubrication of the bearings is resorted to. The present invention provides a fluid bearing surface so that it can be utilized with liquids which cannot be metered by any other turbine flowmeters which have mechanical bearings required to be lubricated with the flowing liquid.

Since some fluid flow exists around the bearing and the fluid is continually filtered, the fluid bearing surface is always receiving clean fluid to prevent contamination. Also, even when liquids compatible with mechanical bearings are utilized, the present invention will have longer life than prior meters with mechanical bearings. It is difficult to initially obtain accurate concentricity of mechanical bearings with a shaft and lack of concentricity causes bearing wear and future eccentricity. Thus, mechanical bearings will become unusable long before any substantial bearing wear occurs in the present invention.

A tail cone is connected to the downstream side of the rotor and is tapered to gradually increase the flow area downstream of the rotor. Thus, the velocity pressure along the tail cone decreases and the static pressure increases above the static pressure at the turbine rotor so that at some intermediate flow velocity and above, the upstream thrust produced by the tail cone will be greater than the downstream thrust on the rotor. Thus, large downstream thrust cannot develop on the rotor at high flow velocities.

It is therefore an object of the present invention to provide a flowmeter in which the fluid being metered creates a bearing surface for the turbine rotor.

Another object of the invention is to provide a flowmeter which utilizes a bearing surface created by a filtered supply of metered fluid at substantially stagnation pressure so that some flow of the bearing surface results.

Another object of the invention is to provide a flowmeter having a rotor which is suported by a fluid bearing so that no separate lubrication is necessary and fluids which are not good lubricants can be easily metered.

A further object of the present invention is to provide a fluid bearing surface for the turbine rotor of a flowmeter in order to eliminate the wear associated with mechanical bearings for turbine rotors.

Another object of the invention is the provision of a tail cone connected with the downstream side of the turbine rotor of a flowmeter in order to develop a resultant upstream thrust on the rotor at intermediate and high flow velocities.

These and other objects of the invention not specifically set forth above will become readily apparent from the accompanying description and drawings in which:

FIGURE 1 is a sectional view of the flowmeter of the present invention showing the turbine and support therefor in elevation.

FIGURE 3 is an end view of the tail cone looking in the direction of the arrow 3—3 of FIGURE 1 and showing the slots to provide fluid passages.

FIGURE 4 is a partial enlarged view similar to FIGURE 2 showing the bearing sleeve mounted on the rotor shaft.

FIGURE 5 is a partial enlarged view similar to FIGURE 2 showing the nose cone surrounding the filter, and FIGURE 6 is a transverse section along line 6—6 of FIGURE 1 showing the turbine blades and support vanes.

Figure 2:
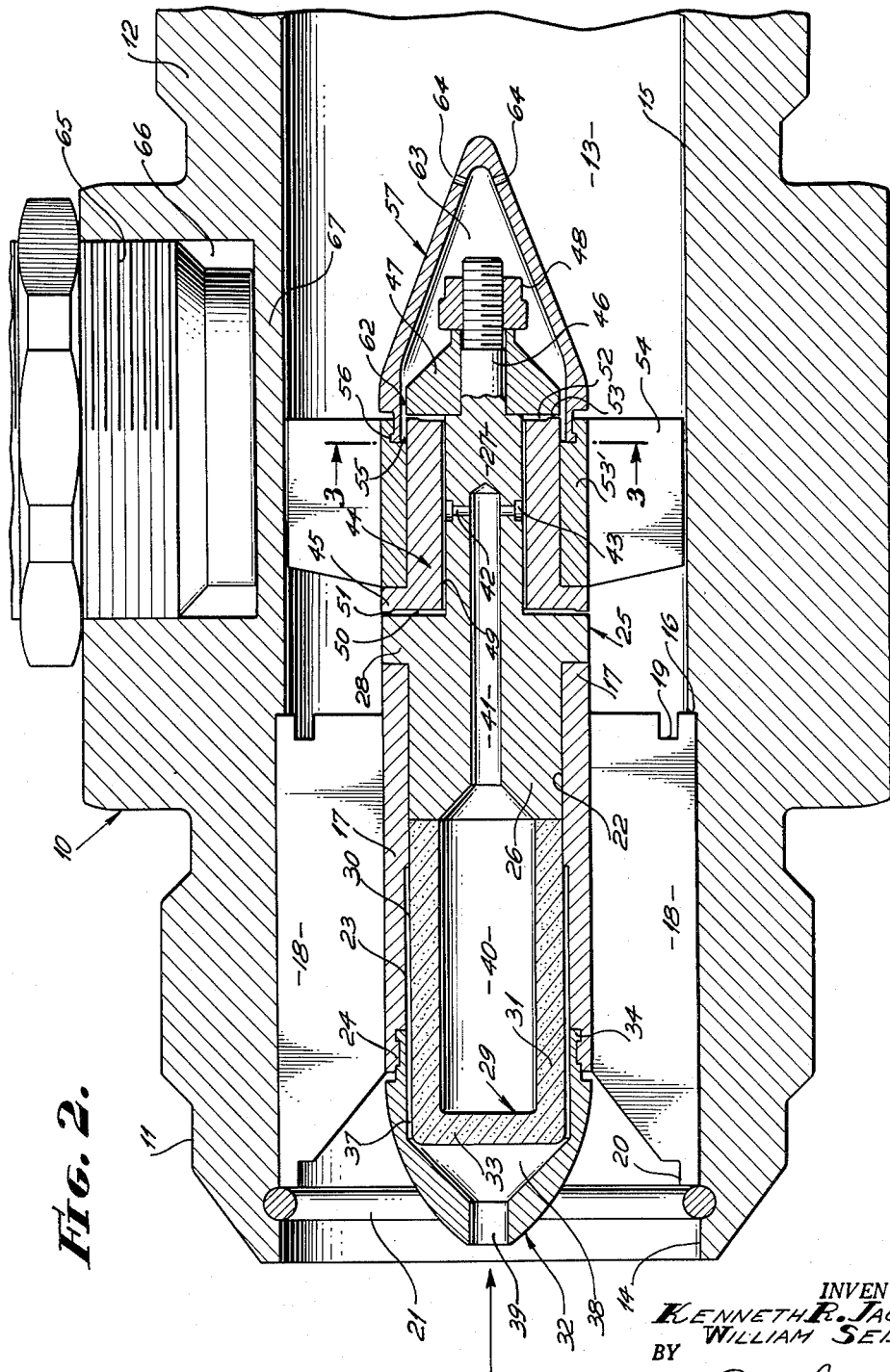
FIGURE 2 is an enlarged sectional view similar to FIGURE 1, showing the turbine and support therefor in section.

The embodiment of the invention chosen for illustration comprises a casing 10 having opposite ends 11 and 12 connected to section of a flow passage (not shown) in any suitable manner so that the interior passage 13 within the casing 10 has the same fluid flow as the main flow passage. As illustrated by the arrows in FIGURES 1 and 2, the fluid enters the casing at end 11 and leaves at end 12. The interior surface of casing 10 has a larger section 14 connected with a smaller section 15 by a step portion 16. A cylindrical shaft support member 17 has six radially extending support vanes 18 rigidly fixed thereto and evenly spaced around its circumference. The downstream end of the vanes 18 abut the step portion 16 in order to properly locate the shaft support 17. The downstream and upstream ends of the vanes contain notches 19 and 20, respectively, which receive a suitable expansion tool for forcing the vanes into secure engagement with surface section 14. A retaining ring 21 contained in a groove in surface section 14 at the upstream end of vanes 18 helps to retain the vanes in position.

The interior surface of shaft support member 17 is divided into sections 22, 23 and 24 of increasing diameter. A shaft member 25 has shaft ends 26 and 27 of different diameters separated by a ring portion 28. The shaft end 26 has a press fit with section 22 of member 17 and is inserted into section 22 until ring portion 28 abuts the end of member 17. Thereafter, the open end of a cup-shaped filter member 29, formed of a suitable filter material such as sintered metal or wire mesh, is inserted into section 22 until it abuts shaft end 26. The filter member 29 also has a press fit with section 22 and a space 30 separates the side 31 of filter member 29 from section 23 of member 17.

A hollow nose cone 32 surrounds the end 33 of the filter member and has a reduced end 34 which is slightly larger than end section 24 of member 17. However, as illustrated in FIGURE 5, the end 34 contains a surface cutout 35 and a plurality of slots 36 of less length than section 24 so that end 34 can be deformed and forced into end section 24 after the filter member 29 is installed. A space 37 exists between side 31 of the filter member and the nose cone, and a space 38 exists between the nose cone and the end 33 of the filter member. An opening 39 in the nose cone supplies fluid from passage 13 into spaces 38, 37 and 30 around the filter member 29 so that filtered fluid enters space 40 within the filter member. By supporting the filter member only at its open end, a large filter area is provided completely around the filter member and over most of its length so that fluid will always fill the interior space 40.

The shaft member 25 contains a central passage 41 which communicates with space 40 and terminates within the shaft end 27. Four equally spaced, radial passages 42 extend outward from the end of passage 41 and communicate with a groove 43 in the surface of shaft end 27. A bearing sleeve 44 has a central opening so that the sleeve can be inserted over shaft end 27. The sleeve has a shoulder 45 located adjacent ring portion 28. A projection 46 extends from the shaft end 27 and receives a thrust plate 47 which is held against end 27 and adjacent the end of bearing sleeve 44 by a nut 48 threaded onto projection 46. An annular clearance space 49 exists between the interior of bearing sleeve 44 and the surface of shaft end 27. Also, an end clearance 50 tapering to a clearance 51 exists between shoulder 45 and ring portion 28, and an end clearance 52 tapering to a clearance 53 exists between the thrust plate 47 and the end of bearing sleeve 44. As will be later described, these clearance spaces are in communication with groove 43 to provide fluid bearing surfaces for bearing sleeve 44 and it will be understood that the sizes of these clearance spaces are exaggerated in FIGURES 2 and 4.

Before assembly on the shaft end 27, the bearing sleeve 44 is forced into rotor hub 53' until shoulder 45 abuts the end of the hub. Eight twisted turbine blades 54 extend radially outward from hub 53' and the ends of the blades are located closely adjacent the surface section 15. One end of hub 53' contains a step 55 which receives reduced end 56 of a tail cone 57. The end 56 is slightly larger in diameter and length than step 55 and contains a plurality of slots 58 and a groove 59 (see FIGURE 3) so that the end can be deformed and forced into step 55. Because of the length of reduced end 56, the end 60 of the main body of the tail cone is spaced from hub 53' to form annular space 61. Also, the reduced end of the tail cone is larger in diameter than bearing sleeve 44 and thrust plate 47 to form a clearance space 62 in communication with clearance 53 and space 63 within the tail cone. The clearance space 62 communicates with passage 13 through the slots 58 and space 61 between the nose cone and the hub. A pair of openings 64 are located in the reduced end of the tail cone to permit cleaning.

Fluid flowing through passage 13 will produce a rotative torque upon blades 54 and cause rotation of the blades at a speed proportional to the fluid flow velocity through passage 13. In order to measure the rotational speed of the blades, an electromagnetic pickup 65 is secured in a cavity 66 in casing 10. The pickup 65 produces an electromagnetic field through the thin casing section 67 and this field is varied as each blade 54 moves therethrough in order to produce pickup sigals for measuring rotational speed. Any suitable type of pickup well known in the art can be utilized to measure blade speed as far as the present invention is concerned.

During operation of the invention, the bearing sleeve is supported on a fluid bearing surface contained in clearance space 49. Fluid for the bearing surface enters the opening 39 in the nose cone and is filtered through most of the area of filter member 29 to remove all contaminants. The fluid pressure in space 40, passages 41 and 42, and groove 43, which supply fluid to clearance space 49, is substantially the stagnation pressure of the fluid entering the passage 13. As the fluid passes around nose cone 32, the velocity pressure is increased and the static pressure is decreased because of a reduction in flow area around shaft support member 17, ring portion 28 and turbine rotor 53'. Thus, the static pressure in passage 13 at the location of clearance 51 and at the location of space 61 communicating with clearance 53, is considerably less than the stagnation pressure in groove 43. Because of the difference in pressure, fluid will continually flow through clearance space 49 to end clearances 50 and 52 and then to passage 13 through restricted end clearances 51 and 53. The clearances at opposite ends of bearing sleeve 44 provide thrust bearing surfaces which receive the thrust loads on the turbine rotor. All of the clearances are small enough so that flow through the bearing surfaces to passage 13 is as small as possible. Since minimum clearance exists at clearance spaces 51 and 53, and because of the negligible flow through the clearances, substantially stagnation pressure will exist in spaces 49, 50 and 52. In one embodiment of the invention, the clearance space 49 is about .0003 inch and the clearances 50 and 52 are about .0008 inch and will vary between .0013 and .0005 inch depending on the direction of the end thrust on the rotor. Also, the end clearances 51 and 53 are about .0005 inch and will vary between .0010 and .0002 depending on the direction of the end thrust on the rotor. When the rotor is stationary and fluid is introduced to passage 17, the development of the stagnation pressure internally of the bearing produces a break-away force which quickly centers the bearing sleeve on a fluid bearing surface. Even before the fluid bearing surface develops, the air pushed through the passage 13 ahead of the fluid develops a gas bearing so that dry starts are not injurious.

Since the flow area of passage 13 increases downstream from rotor hub 53' along the surface of tail cone 57, the static pressure will increase as the velocity pressure decreases and a static pressure difference will exist between the openings 64 and the space 61, so that a small amount of fluid flows from openings 64 through space 63 and space 61 to passage 13 during operation of the flowmeter. Also, prior to the operation of the flowmeter, it is often desirable to clean the meter with air or dry nitrogen. When such a gas is passed through the meter, the gas will enter the holes 64 and leave through space 61 so that circulation of gas will occur through the interior of the tail cone as well as through the other internal spaces supplied from opening 39.

The static pressure acting on the surface of tail cone 57, produces an upstream thrust on the bearing sleeve 44 since the end 56 of the tail cone is connected with the rotor hub. At low flow velocities, the upstream static force on the tail cone subtracts from the downstream fluid drag on the rotor blades, and the rotor experiences a resultant reduced downstream thrust against the fluid bearing present in clearance spaces 52 and 53. However, as the flow volume increases, a value is reached at which the upstream static pressure on the tail cone surface overcomes the downstream drag on the blades and the rotor experiences a resultant upstream thrust against the fluid bearing surface in clearance spaces 50 and 51. At flow volumes higher than this value, the magnitude of the resultant upstream thrust increases so that at very high rotor speeds, there is no danger of the rotor moving off the shaft end 27 even though lock nut 48 is accidentally removed. It is therefore apparent that the direction of the resultant end thrust on the rotor hub 53' will change from downstream to upstream at some intermediate flow velocity and that the end thrust will be taken up by fluid bearing surfaces.

It is therefore apparent that the present invention provides a flowmeter in which a fluid film bearing is produced from the fluid flowing through the flowmeter. A small amount of fluid flow through the bearing film takes place and the bearing fluid is filtered to eliminate any contamination. Thus, the flowmeter does not require mechanical bearings and the fluid bearing can be formed by measured fluids which would be extremely detrimental to mechanical bearings. Also, because mechanical bearings are not required, to flowmeter will have greater life since initial eccentricity of mechanical bearing and additional eccentricity resulting from wear of mechanical bearings is not a problem. By utilizing the tail cone 57 attached to the turbine rotor, the axial thrust on the rotor will switch from the downstream to the upstream direction at an intermediate flow velocity and will prevent loss of the rotor at high velocities. Also, the openings in the reduced end of the tail cone provide a novel way for cleaning of the meter.

It is understood that the bearing sleeve 44 becomes supported by a fluid bearing surface in clearance 49 upon rotation of the rotor to produce a break-away force through wedging action of the fluid within the sleeve. The creation and maintenance of the fluid end thrust bearing surfaces is primarily dependent upon the magnitude of the pressure drop across the spaces 51 and 62. Since there are no metal surface contacts during operation of the flowmeter, the life of the flowmeter is greatly extended. Generally, the fluid bearing surface can be formed from liquids within the viscosity range that can be satisfactorily metered. Also, while the fluid bearing surface is formed from a fluid within the flow passage, an external source of the fluid could be supplied to the bearing surface through the flowmeter casing. Various other modifications of the invention are contemplated by those skilled in the art without departing from the spirit and scope of the invention as hereinafter defined by the appended claims.

What is claimed is:

1. A fluid flowmeter comprising a casing containing a flow passage for the measured fluid, a turbine shaft supported within said casing, a bearing sleeve surrounding said shaft, a turbine rotor supported on said bearing sleeve and having blades located in said flow passage, means located at opposite ends of said sleeve for confining said sleeve on said shaft, said sleeve being dimensioned to provide clearance spaces separating said sleeve from said shaft and from said confining means, fluid supply means in communication with the surface of said shaft for introducing fluid to said spaces and producing a bearing surface between said shaft and said sleeve and an end thrust bearing surface at each end of said sleeve, and a tail cone extending downstream of said rotor to a nose portion and having its base secured to said rotor, the static pressure developed on said tail cone producing a resultant upstream thrust on said rotor against the upstream thrust bearing at flow velocities above a predetermined value.

2. A fluid flowmeter as defined in claim 1 wherein said tail cone has a hollow interior, first opening means connecting said interior to said flow passage through the nose portion, and second opening means connecting said interior to said flow passage through said base portion, the difference in static pressure between said opening means causing upstream flow of cleaning gas introduced to said flow passage prior to the introduction of the fluid to be measured.

3. A fluid flowmeter as defined in claim 2 wherein said bearing sleeve has a shoulder on its upstream end extending to said flow passage so that said upstream thrust bearing communicates directly with the fluid flowing in said passage, said downstream thrust bearing being connected with the fluid in said passage through said second opening means.

4. A fluid flowmeter comprising:
a casing containing a flow passage for the measured fluid,
a member supported centrally within said passage and having a shoulder providing a reduced end shaft,
a bearing sleeve surrounding said shaft and having a clearance therewith to provide space for an axially extending fluid bearing,
an enlarged portion at one end of said sleeve and spaced opposite from said shoulder to provide space for an upstream fluid thrust bearing in communication with said axially extending bearing and with said fluid passage,
a turbine rotor supported on said bearing sleeve and having blades located in said flow passage,
a projection extending downstream from the end of said shaft,
a thrust plate spaced opposite from the other end of said sleeve to provide space for a downstream fluid thrust bearing in communication with said axially extending bearing end with said fluid passage,
a fluid supply passage in said shaft and communicating with the axial bearing space for imparting fluid to all said bearing spaces, and
a tail cone producing a resultant upstream thrust on said rotor against the upstream thrust bearing at flow velocities above a predetermined value.

5. A fluid flowmeter comprising:
a casing containing a flow passageway for the fluid,
a turbine shaft supported within said casing,
a turbine rotor having a bearing received by said shaft and separated from said shaft by a clearance space,
means for introducing fluid into said space between said shaft and said bearing for providing a fluid bearing surface for said rotor,
said fluid introducing means comprising an inlet conduit having an open end communicating with the fluid flow in said passageway upstream of said rotor and communicating with said space through said turbine shaft, and
a restricted discharge conduit for connecting said clearance space with said fluid passageway at a location having a static pressure below the pressure in said inlet conduit so that some fluid flow exists through said clearance space.

6. A fluid flowmeter as defined in claim 5 wherein said open end of said inlet conduit faces upstream in said fluid passageway, said discharge conduit being restricted enough to maintain the pressure in said inlet conduit at substantially stagnation pressure of the fluid in said passageway at said open end.

7. A fluid flowmeter comprising:
a casing containing a flow passage for the measured fluid,
a turbine shaft supported within said casing,
a bearing sleeve surrounding said shaft,
a turbine rotor supported on said bearing sleeve and having blades located in said flow passage,
means located at opposite ends of said sleeve for confining said sleeve on said shaft, said bearing sleeve having clearance between said shaft and said confining means to provide
clearance spaces separating said sleeve from said shaft and from said confining means, and
fluid supply means in communication with the surface of said shaft for introducing fluid to said spaces and producing fluid bearing surfaces over the interior and end surfaces of said bearing sleeve,
said fluid supply means comprising an inlet conduit having an open end communicating with the fluid flow in said passageway upstream of said rotor and extending into said shaft for communication with said shaft surface, said clearance spaces at the ends of said bearing sleeve being connected with said fluid passageway at a location having a static pressure below the presure in said inlet conduit to provide for some fluid flow through all said clearance spaces.

8. A fluid flowmeter as defined in claim 7 having a filter member located in said inlet conduit to remove contaminants from the fluid flow to said clearance spaces.

9. A fluid flowmeter as defined in claim 7 wherein said open end of said inlet conduit faces upstream in said fluid passageway, said spaces being restricted enough to maintain the pressure in said inlet conduit at substantially stagnation pressure of the fluid in said pasasgeway.

10. A fluid flowmeter comprising:
- a casing containing a flow passageway form the measured fluid,
- a member supported centrally within said passageway and having a shoulder providing a reduced end shaft,
- a bearing sleeve surrounding said shaft and having a clearance therewith to provide space for an axially extending fluid bearing,
- an enlarged portion at one end of said sleeve and spaced opposite from said shoulder to provide space for an upstream fluid thrust bearing in communication with said axially extending bearing space and with said fluid passageway,
- a turbine rotor supported on said bearing sleeve and having blades located in said flow passageway,
- a projection extending downstream from the end of said shaft,
- a thrust plate connected with said projection and spaced opposite from the other end of said sleeve to provide space for a downstream fluid thrust bearing in communication with said axially extending bearing space and with said fluid passageway,
- fluid supply means in communication with said axial bearing space for imparting fluid to all said bearing spaces,
- said fluid supply means comprising an inlet conduit having an open end communicating with the fluid flow in said passageway upstream of said rotor and extending into said shaft for communication with said axially extending bearing space,
- said upstream and downstream thrust bearing spaces being connected with said fluid passageway at a location having a static pressure below the pressure in said inlet conduit to provide for some fluid flow through all said spaces forming said fluid bearings.

References Cited in the file of this patent
UNITED STATES PATENTS

| | | |
|---|---|---|
| 808,150 | Fristoe | Dec. 26, 1905 |
| 1,906,715 | Penick | May 2, 1933 |
| 2,709,755 | Potter | May 31, 1955 |
| 2,812,661 | Cox | Nov. 12, 1957 |